US008516570B2

(12) United States Patent
Tomiyasu et al.

(10) Patent No.: US 8,516,570 B2
(45) Date of Patent: Aug. 20, 2013

(54) IMAGE FORMING DEVICE AND IMAGE FORMING PROGRAM

(75) Inventors: Kazuhiro Tomiyasu, Toyokawa (JP); Masahiro Imamura, Toyokawa (JP); Tomoko Maruyama, Toyokawa (JP); Takeshi Hibino, Toyokawa (JP); Kentaro Nagatani, Toyokawa (JP)

(73) Assignee: Konica Minolta Business Technologies, Inc., Chiyoda-Ku, Tokyo (JP)

( * ) Notice: Subject to any disclaimer, the term of this patent is extended or adjusted under 35 U.S.C. 154(b) by 899 days.

(21) Appl. No.: 12/332,634

(22) Filed: Dec. 11, 2008

(65) Prior Publication Data

US 2009/0158422 A1    Jun. 18, 2009

(30) Foreign Application Priority Data

Dec. 13, 2007  (JP) .................................. 2007-321732

(51) Int. Cl.
 *G06F 12/14* (2006.01)
 *G06F 13/00* (2006.01)
(52) U.S. Cl.
 USPC ............................................. 726/17; 726/26
(58) Field of Classification Search
 None
 See application file for complete search history.

(56) References Cited

U.S. PATENT DOCUMENTS

| 7,454,796 B2* | 11/2008 | Mazzagatte et al. ............ 726/28 |
| 2005/0100378 A1* | 5/2005 | Kimura et al. ................. 400/76 |
| 2005/0183141 A1 | 8/2005 | Sawada |
| 2005/0204144 A1* | 9/2005 | Mizutani ....................... 713/182 |
| 2006/0007469 A1* | 1/2006 | Uruma ......................... 358/1.14 |

FOREIGN PATENT DOCUMENTS

| JP | 6-183110 A | 7/1994 |
| JP | 2005-262864 | 9/2005 |
| JP | 2006-334873 A | 12/2006 |
| JP | 2007-148854 | 6/2007 |
| JP | 2007-249959 | 9/2007 |
| JP | 2007-320166 | 12/2007 |

OTHER PUBLICATIONS

Notification of Reason(s) for Refusal issued in the corresponding Japanese Patent Application No. 2007-321732 dated Nov. 17, 2009, and an English Translation thereof.

* cited by examiner

*Primary Examiner* — Philip Chea
*Assistant Examiner* — Fatoumata Traore
(74) *Attorney, Agent, or Firm* — Buchanan Ingersoll & Rooney PC

(57) ABSTRACT

The present invention is an image forming device capable of executing an authentication print printing. The image forming device includes: an authentication print detecting unit which detects whether to execute a job as the authentication print printing by referencing predetermined data; an authentication unit; a user authentication unit which outputs the result of the user authentication; a job executing unit; a user interface; and a user interface input mode switching unit which switches an information input/output mode of the user interface, wherein, an instruction to execute a first process can be received, and wherein the first process includes processes in which: the execution of the authentication print printing starts based on the result of the user authentication output by the user authentication unit; and the result of the user authentication is invoked so that the information input/output mode of the user interface is switched to a login mode.

8 Claims, 11 Drawing Sheets

IMAGE FORMING DEVICE AND IMAGE FORMING PROGRAM

This application is based on an application No. 2007-321732 filed in Japan, the contents of which are hereby incorporated by reference.

BACKGROUND OF THE INVENTION

1. Field of the Invention

The present invention relates to an image forming device and an image forming program used in the image forming device, and more particularly, to an image forming device which requests user authentication for the start of printout process, and an image forming program used in the image forming device.

2. Description of the Related Art

In recent years, the image forming device is connected to a plurality of information processing devices (terminals) by way of a network, and is shared by a plurality of users using the plurality of information processing devices. The image forming device is a digital multifunction peripheral (Multi-Function Peripheral (MFP), a Scan Print Copy (SPC), or All In One (AIO)) having at least two or more functions of a printer, a facsimile, a copying machine, a scanner, and the like. The information processing device (terminal) is a personal computer (PC), or the like. The image forming device and the information processing device are communicably connected to each other by way of a communication network such as Local Area Network (LAN) and the Internet to configure an image forming system. The image forming system can be formed by connecting one image forming device and one information processing device at one-to-one in its minimum configuration. Recently, however, a large-scale image forming system is often being built up in which a plurality of image forming devices and a plurality of information processing devices are connected to each other.

When the user attempts to output a printed material of a desired document using the image forming device in such image forming system, the user uses the information processing device to specify the data file of the relevant document saved in the image forming system, select and specify the image forming device to execute the printout of the relevant document from a plurality of image forming devices in the image forming system, and finally, input an instruction to execute the printout to the information processing device.

The information processing device sends job data described with the specified data file and various setting data related to the printout to the specified image forming device. The image forming device that received the job data executes printing based on the job data. The document printed material is discharged from a paper discharge tray of the image forming device. The user then goes to the image forming device and collects the discharged document printed material.

However, the user is not necessarily nearby the image forming device when the document printed material is discharged from the image forming device. Since the image forming device is shared by a plurality of users, another user might be near the image forming device. Thus, a problem of ensuring information security related to the document printed material discharged from the image forming device arises in the image forming system.

JP 6-183110 A discloses a printing device (printer). Such printing device receives print data from a plurality of host computers connected by way of a network, and executes printing based on the received print data. The print data sent to the printer may contain a password. Thus, when receiving the print data from the computer, the printer determines whether or not a password is contained in the received print data. When determined that the received data contains a password, the printer executes the printout based on the received print data only after confirming that the user has correctly input the password through a user interface of the printer.

The printing device disclosed in JP 6-183110 A executes printing when the password given to the print data is matched with the password input by the user. The relevant printing device ensures information security on the information indicated by the print data in this manner.

The technique disclosed in JP 6-183110 A is a technique in which the printing device requests for a password to be input by the user, that is, user authentication as a trigger for defining the start of printout, and is not a technique defining what kind of information the printing device accepts from the user via the user interface or what kind of information input to reject or ignore when the printing device performs user authentication serving as a trigger for defining the start of printout for each printout process.

JP 2006-334873 A discloses an image forming device for executing printing in response to a printing instruction from an external device. When the received printing instruction requests to ensure security, the authentication process related to ensuring of security is performed, and the print data related to the printing instruction is acquired only after the authentication process is successfully completed in the image forming device.

The image forming device disclosed in JP 2006-334873 A thus suppresses the capacity of the memory necessary for keeping the print data at low level, and ensures information security on the printing process.

Numerous documents related to information security of the image forming system have already been proposed.

The image forming device for performing user authentication through a predetermined user authentication means arranged in the image forming device at the start of execution of the printout as disclosed in JP 6-183110 A is already widely known. The technical methodology adopted in the technique of JP 6-183110 A is an effective methodology for ensuring the user to be near the image forming device when the image forming device actually executes the printout.

However, at the point the user authentication disclosed in JP 6-183110 A is successfully completed for the user to start the execution of the printout process, the image forming device does not permit input of information via its user interface with respect to the user related to the relevant user authentication. Thus, even if the user operates the user interface of the image forming device to instruct pause or stop of the printout to the image forming device, such operation will be ignored. In the conventional image forming device, an operation for logging into the image forming device to have the user interface of the image forming device operable is separately requested to the user. The user must separately execute the login operation when attempting to input information via the user interface of the image forming device, and it is thus very difficult to temporarily pause or stop the process being printed out. Such problem is also not addressed JP 2006-334873 A.

When the user attempts to instruct another further image forming process to the image forming device via the user interface of the image forming device when collecting the printed material, the user again needs to separately execute the login operation. Thus, the user sometimes feels bothersome on the operation of the image forming device.

SUMMARY OF THE INVENTION

In view of such problems, it is an object of the present invention to provide an image forming device capable of collectively performing, in association with the user authentication, the login process by which the user interface is made operable by invoking the result of the user authentication when performing user authentication using a predetermined user authentication unit arranged in the image forming device to start the execution of the printout, and to improve the operability of the image forming device. The subject invention ensures information security on the printed and discharged document printed material at high level and enhances the operability of the user with respect to the image forming device thereby enhancing the productivity of the image forming process such as printing.

In one aspect of the present invention, the present invention is an image forming device capable of executing an authentication print printing, which is a printout process of performing user authentication using a predetermined authentication device and determining start of execution of the printout based on a result of the user authentication. The image forming device includes: a communication interface, communicating with an external terminal, which receives job data from the terminal; an authentication print detecting unit which detects whether to execute a job related to the job data as the authentication print printing or a normal printout process by referencing predetermined data; an authentication unit which is the predetermined authentication device; a user authentication unit which outputs the result of the user authentication using the authentication unit; a job executing unit which executes the job related to the job data based on the result of the user authentication; a user interface with a display which provides information and an input unit which receives an input of information; and a user interface input mode switching unit which switches an information input/output mode of the user interface, wherein the input unit receives an input of an instruction to execute a first process and wherein the first process includes processes in which: the user authentication unit performs a user authentication for executing the authentication print printing; the job executing unit starts the execution of the authentication print printing related to the job data based on the result of the user authentication output from the user authentication unit; and the user interface input mode switching unit invokes the result of the user authentication output from the user authentication unit so as to switch the information input/output mode of the user interface to a login mode of information input/output mode capable of inputting information other than information related to the user authentication to start the execution of the authentication print printing.

In another aspect of the present invention, the present invention is a computer readable medium storing an image forming program executable by a computer of an image forming device capable of executing an authentication print printing, which is a printout process of performing user authentication using a predetermined authentication device and determining start of execution of the printout based on a result of the user authentication. The program includes: code that receives job data from a terminal, communicating with the external terminal; code that detects whether to execute a job related to the job data as the authentication print printing or a normal printout process by referencing predetermined data; code that outputs the result of the user authentication using the predetermined authentication device; code that executes the job related to the job data based on the result of the user authentication; code that enables a user interface with a display which provides information and an input unit which receives an input of information to receive an input of instruction to execute a first process; and code that switches an information input/output mode of the user interface, wherein the first process includes processes in which: a user authentication for executing the authentication print printing is performed; the execution of the authentication print printing related to the job data starts based on the result of the user authentication; and the result of the user authentication is invoked so that the information input/output mode of the user interface is switched to a login mode of the information input/output mode being capable of receiving an input of information other than information related to the user authentication to start the execution of the authentication print printing.

The present invention collectively executes a login process for making the user interface of the image forming device operable, invoking the result of the user authentication, when performing the user authentication using a predetermined user authentication unit arranged in the image forming device. Thus, the image forming device etc. of the present invention sufficiently ensures information security of the document printed material that is printed out, and enhances the operability of the user with respect to the image forming device etc., thereby enhancing the productivity of the image forming process.

Other objects and further features of the present invention will be apparent from the following detailed description when read in conjunction with the accompanying drawings.

DETAILED DESCRIPTION OF THE PREFERRED EMBODIMENTS

Figure 1:
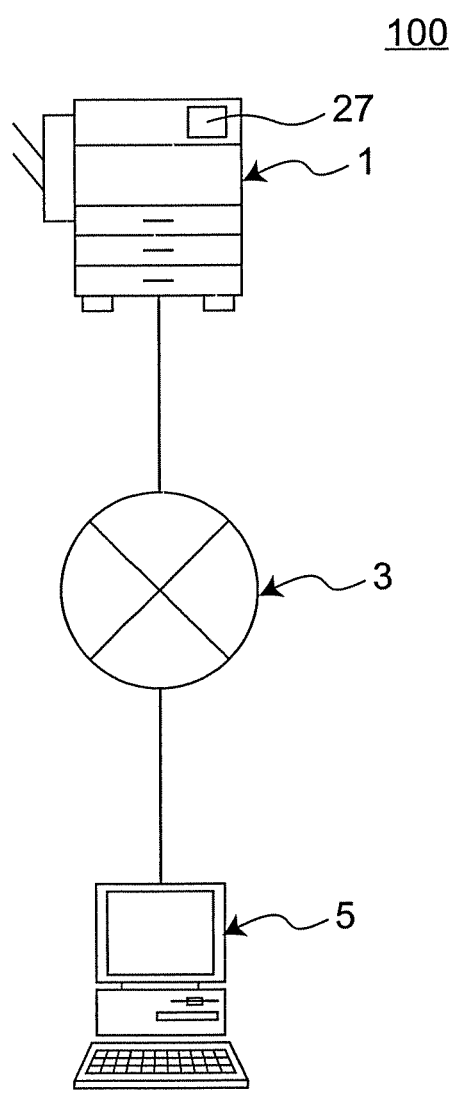
FIG. 1 is a configuration diagram of an image forming system according to an embodiment of the present invention.

The present embodiment relates to an image forming device, and an image forming program executed in the image forming device.

The image forming device according to the present embodiment is an image forming device capable of executing "authentication print" printout process, to be hereinafter described. Furthermore, the image forming device according to the present embodiment is an image forming device capable of executing "authentication print" printout process or normal printout process for every job to be executed. The setting of the printout process follows the information of "authentication print" setting contained in the job data.

A terminal connected to the image forming device generates the job data. The setting related to the printout process can be set in the terminal.

<Regarding "Authentication Print (Authentication & Print)" Printout Process>

The "authentication print (authentication & print)" printout process will be briefly described before specifically describing the embodiment of the present invention. The "authentication (&) print" printing refers to a printout mode In a case where the image forming device executes the job involving the printout process, the image forming device performs user authentication using a predetermined authentication means, and starts the printout on the job only when the user authentication is successful. In other words, in the authentication print printout, the image forming device does not immediately execute the printout even when accepting the job. Instead, the image forming device holds the data related to the printout until confirming that the user authentication using the predetermined authentication means is successful, and starts the execution of the printout after confirming that the user authentication is successful. The user authentication herein is a user authentication on the user who has input the job. The user authentication for starting the execution of the authentication print printout process is processed in the image forming device as a completely different operation from the login operation for making the user interface of the image forming device operable. Thus, the user interface of the image forming device cannot be operated even if the user authentication is successful. The authentication print is also referred to as "Touch & Print".

In the "normal" printout process, the image forming device immediately executes the printout on the job when accepting the job. The authentication print printout process differs from the normal printout process in that the printout does not start until the user authentication using the predetermined authentication means is successful.

In the image forming device according to the present embodiment, user authentication using a predetermined authentication means is requested to the user when starting the execution of the "authentication print" printout process. The login operation by which the user interface of the image forming device is made operable can be collectively executed by invoking the result of the user authentication.

Thus, in the image forming device according to the present embodiment, at the point user succeeds in user authentication for starting the execution of the authentication printout process, the image forming device can transfer to a state where the user can operate the user interface of the image forming device. Therefore, ensuring of convenience and productivity of the image forming process, and ensuring of information security are both met at high level in the image forming process using the image forming system of the present embodiment.

The preferred embodiments of the present invention will now be described with reference to the accompanied drawings.

FIG. 1 is a schematic diagram of a configuration of an image forming system 100 according to an embodiment of the present invention.

The image forming system 100 includes the digital multifunction peripheral (MFP) 1 serving as the image forming device, and a personal computer (PC) 5 serving as the terminal. The MFP 1 and the PC 5 are communicably connected by way of the network 3.

The digital multifunction peripheral 1 configures an image forming device according to the present embodiment. The digital multifunction peripheral (MFP) is an image forming device collectively having plural functions such as print function, copy function, scanner function, facsimile function, e-mail transmission function, and the like. However, the image forming device according to the present embodiment merely needs to be an image forming device capable of receiving the job data transmitted from the terminal via the network, and executing the printout process based on the relevant job data. The MFP 1 is also equipped with an authentication unit 27 serving as a predetermined authentication means for performing user authentication in the authentication print printout process. The authentication unit 27 does not necessarily need to be built in the body of the MFP 1. The authentication unit 27 merely needs to be connected to the respective MFP 1, and arranged proximate thereto.

The personal computer 5 configures a terminal (information processing device) according to the present embodiment. The terminal according to the present embodiment does not need to be an information processing device having versatility such as personal computer. The terminal according to the present embodiment can be realized simply with a device capable of instructing printout of the document to the image forming device.

<Hardware Configuration of the Image Forming Device>

Figure 2:
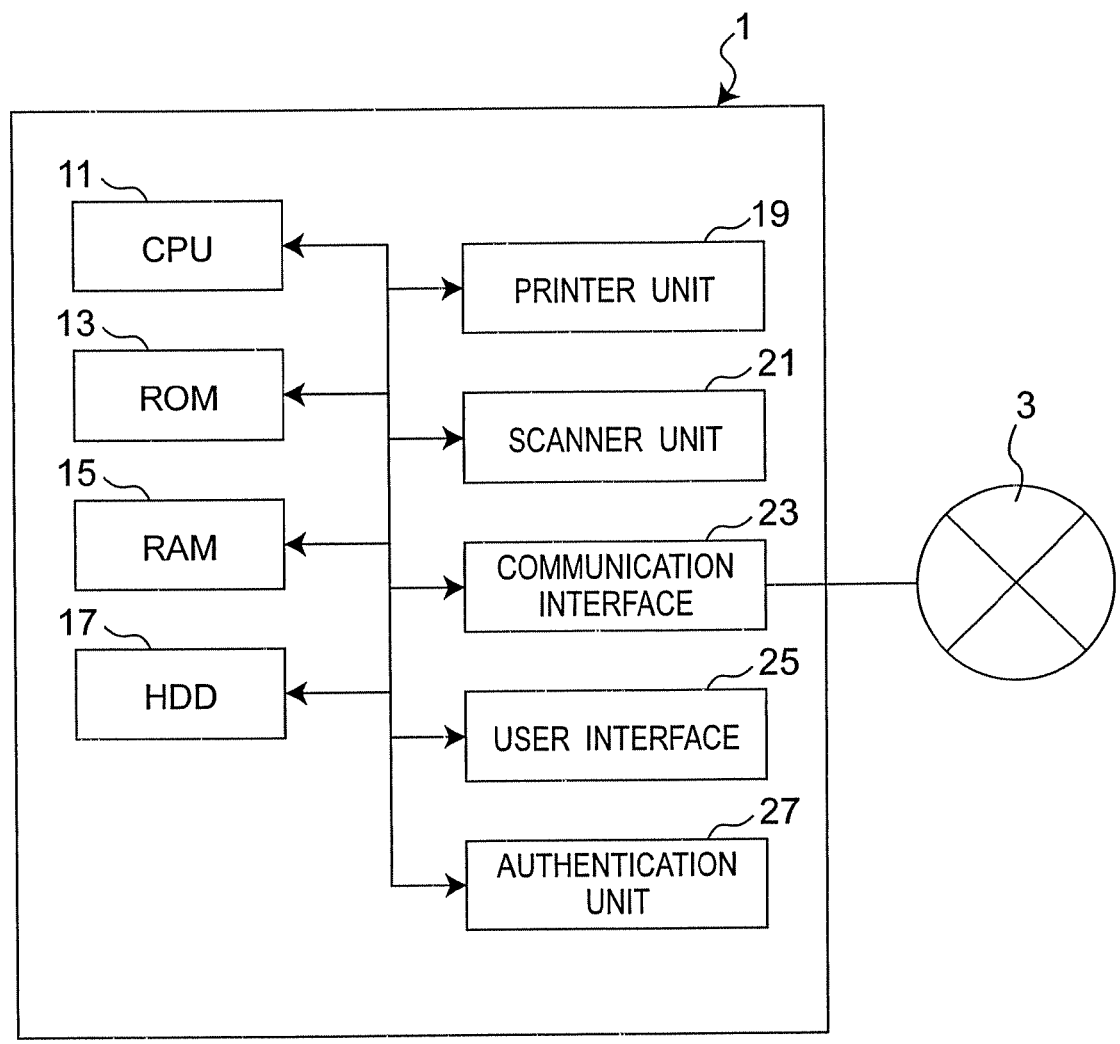
FIG. 2 is a hardware configuration of an image forming device according to the embodiment of the present invention.

FIG. 2 is a block diagram showing a hardware configuration of the MFP 1.

The MFP 1 includes a central processing unit (CPU) 11, a read-only memory (ROM) 13, a random access memory (RAM) 15, a hard disc drive (HDD) 17, a printer unit 19, a scanner unit 21, a communication interface 23, a user interface 25, and the authentication unit 27, which are connected to each other using a data bus.

The CPU 11 executes an image forming program held in the ROM 13, the RAM 15, or the HDD 17, or executes an image forming program provided via the communication interface 23, or processes the data held in the ROM 13, the RAM 15, or the HDD 17. The CPU 11 configures a control unit etc. of the MFP 1 (image forming device) by executing such programs, and realizes the function of the image forming device of the present embodiment. The image forming program may be installed in advance in the image forming device. Alternatively, the image forming program may be provided to the image forming device by way of a storage medium such as a flexible disc (FD) and an optical disc, or through a communication function such as the Internet.

The ROM 13, the RAM 15, and the HDD 17 are storage devices that hold data and programs. The MFP 1 appropriately and suitably uses such storage device group, and holds the data and the programs that need to be held.

The printer unit 19 executes printout based on the data of the document, and outputs a document printed material printed on a paper medium etc.

The scanner unit 21 photoelectrically reads the information recorded on the paper medium etc., and generates image data of the relevant information.

The communication interface 23 is an interface for performing transmission and reception of data between the MFP 1 and an external device.

The user interface 25 is an operation unit for performing provision and reception of information with the user. The user interface 25 includes a display unit for presenting the information to the user and an input unit for receiving information from the user. The user interface 25 may be obtained by integrally configuring the display unit and the input unit using a liquid crystal touch panel. The user interface 25 may be used as a predetermined authentication means for the authentication print printout process. The user can input information necessary for the user authentication using the user interface 25.

The authentication unit 27 is an information input device used in the user authentication for starting the execution of the printout in the authentication print printout process. The authentication unit 27 may be a biometric authentication unit and the like. The authentication unit 27 may also be an IC card reader for reading information recorded on an IC card that the user possesses. The authentication unit 27 is unnecessary if executing the user authentication using a password input by the user. In this case, user authentication is executed when the user inputs a password etc. using the user interface 25.

<Functional Configuration of the Image Forming Device>

Figure 3:
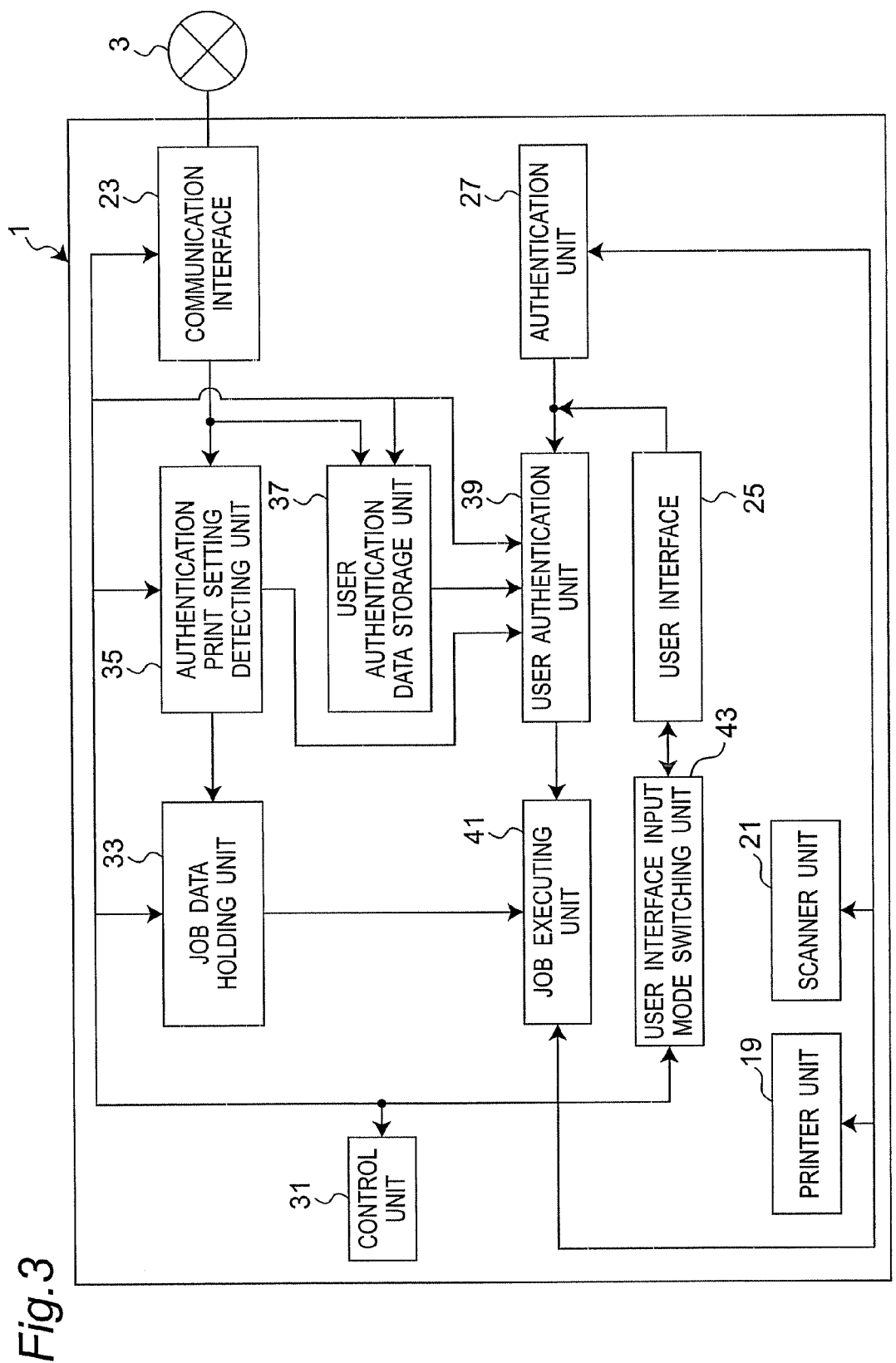
FIG. 3 is a block diagram of a functional configuration of the image forming device.

FIG. 3 is a block diagram of the configuration of the MFP 1 using functional blocks. Functions of the MFP 1 not related to the present embodiment are not illustrated.

The MFP 1 includes a control unit 31. The control unit 31 is realized when the CPU 11 (FIG. 2) executes the image forming program of the present embodiment, as described above. The control unit 31 is connected to each block of the MFP 1 to enable transmission and reception of the data therewith, and recognizes the state of each block to appropriately control the operation of each block.

The communication interface 23 receives the job data via the network 3. The job data contains print attribute data including data on various settings and document data (document/image data) in the case of print job data. The print attribute data includes authentication print setting flag ("True"/"False") related to the authentication print setting.

The authentication print setting detecting unit 35 receives the result of job data, refers the authentication print setting flag contained in the job data, and determines whether the job related to the job data is the authentication print printout process or the normal printout process. When determining that the authentication print setting of the job is ON (authentication print setting flag is "True"), the authentication print setting detecting unit 35 holds the job data in a job data holding unit 33, to be hereinafter described, and instructs user authentication using the authentication unit 27 or the user interface 25 with respect to the user authentication unit 39.

The user authentication data storage unit 37 stores authentication data related to user authentication. The user authentication data storage unit 37 searches the authentication data based on information of the user etc. who instructed the relevant job contained in the job data, and provides the authentication data to the user authentication unit 39.

The user authentication unit 39 performs user authentication using the authentication unit 27, the user interface 25, and the like when the authentication print setting of job data is set to "ON", and outputs the determination result of the user authentication. In the authentication, information (authentication data) necessary for the user authentication is provided in advance in the MFP 1, and the user authentication may be completed only by the MFP 1. Alternatively, the information input from the authentication unit 27 and the like may be transmitted to the authentication server etc. (not shown) to ask the authentication server to perform the authentication, and the result of the authentication may be received from the authentication server.

The job data holding unit 33 temporarily holds the job data related to the printout job which authentication print setting (authentication print printout process setting) is set to "ON" until the user authentication is successfully completed. The job data holding unit 33 receives the job data from the authentication print setting detecting unit 35, temporarily holds the job data, and sends the job data to a job executing unit 41. The job data holding unit 33 holds the job data which authentication print setting flag is "True".

The job executing unit 47 executes the job based on the received job data. However, regarding the job which authentication print setting is set to "ON", the job (e.g., printout) of the user related to the user authentication starts when the determination result of the user authentication output by the user authentication unit 45 is success.

A user interface input mode switching unit 43 switches the input/output mode of information with the user interface 25 by selecting one input/output mode from a plurality of input/output modes.

The input/output mode of information refers to a usage mode of the user interface 25 set in advance for defining the information to be displayed on a display of the user interface 25 by the MFP 1 and the information to be received through an input unit of the user interface 25 by the MFP 1.

The input user interface input mode switching unit 43 switches the information input/output mode of the user interface 25 based on operation mode selecting information input by the user between an information input/output mode (login mode) at which the user can input information other than the information related to the user authentication for the authentication print printout process to the MFP 1, and an information input/output mode (non-login mode) at which the user cannot input information other than the information related to the user authentication to the MFP 1 via the user interface 25.

Normally, the MFP 1 requests for the user authentication in order to switch the information input/output mode from the non-login mode to the login mode. However, the MFP 1 can invoke the result of the user authentication for the authentication print printout process as the result of the user authentication for switching to the login mode based on the operation mode selecting information. The user performs the user authentication for the authentication print printout process to collectively switch the information input/output mode of the user interface 25 from the non-login mode to the login mode.

<Image Forming Process Flow>

Figure 4:
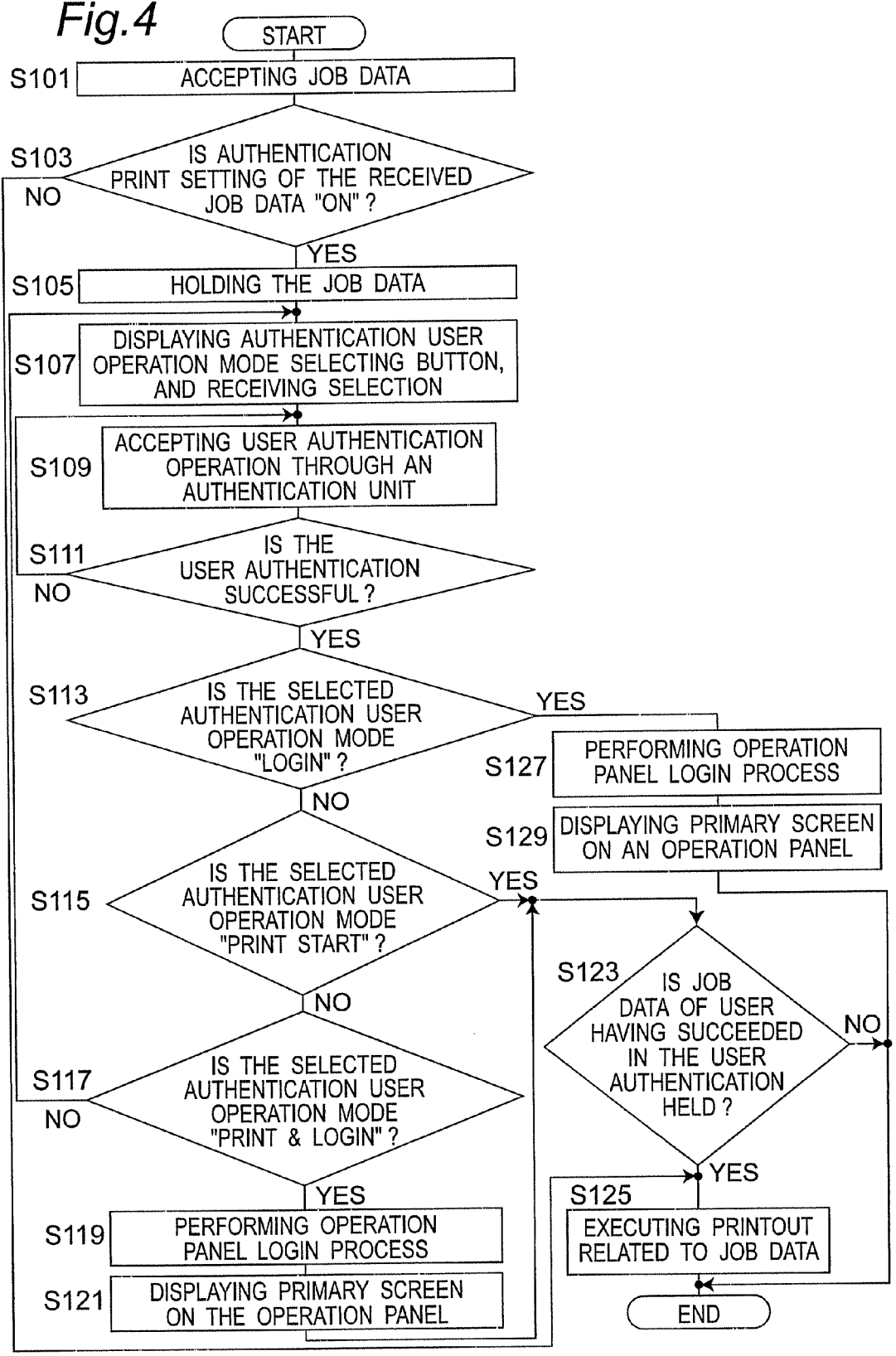
FIG. 4 is a flowchart of a process in the image forming device.

The flow of process of the terminal when the user instructs the printout using the image forming device of the image forming system in the terminal of the present embodiment will now be described with reference to FIG. 4.

In relation to step S101, the user instructs execution of the job involving printing of a document using the PC 5 and the like. The user selects a printer (image forming device (e.g., MFP 1)) for printing out the document, and inputs the selected printer to the PC 5. The PC 5 transmits the job data to the selected printer (image forming device (e.g., MFP 1)).

The job data is transmitted to the MFP 1.

In step S101, the authentication print setting detecting unit 35 of the MFP 1 receives the job data via the communication interface 23.

In step S103, the authentication print setting detecting unit 35 of the MFP 1 refers the authentication print setting flag of the job attribute data of the received job data, and acquires information on the printout setting of the job related to the relevant job data. The process proceeds to step S105 if the authentication print setting flag is "True" (authentication print setting is ON) ("YES" in step S103). The process proceeds to step S125 if the authentication print setting flag is "False" (authentication print setting is OFF) ("NO" in step S103).

In step S105, the job data holding unit 33 of the MFP 1 holds the job data related to the authentication print printout process.

In step S107, the MFP 1 displays an authentication user operation mode selecting button on the user interface 25, and accepts the selection. The authentication user operation mode selecting button is a button for the user related to the user authentication for the authentication print printout process to input the operation mode selecting information for selecting the information input/output mode of the user interface 25 to the MFP 1.

FIGS. 5, 6, 7, 8, and 9 are display examples of the authentication user operation mode selecting button displayed in step S107.

Figure 5:
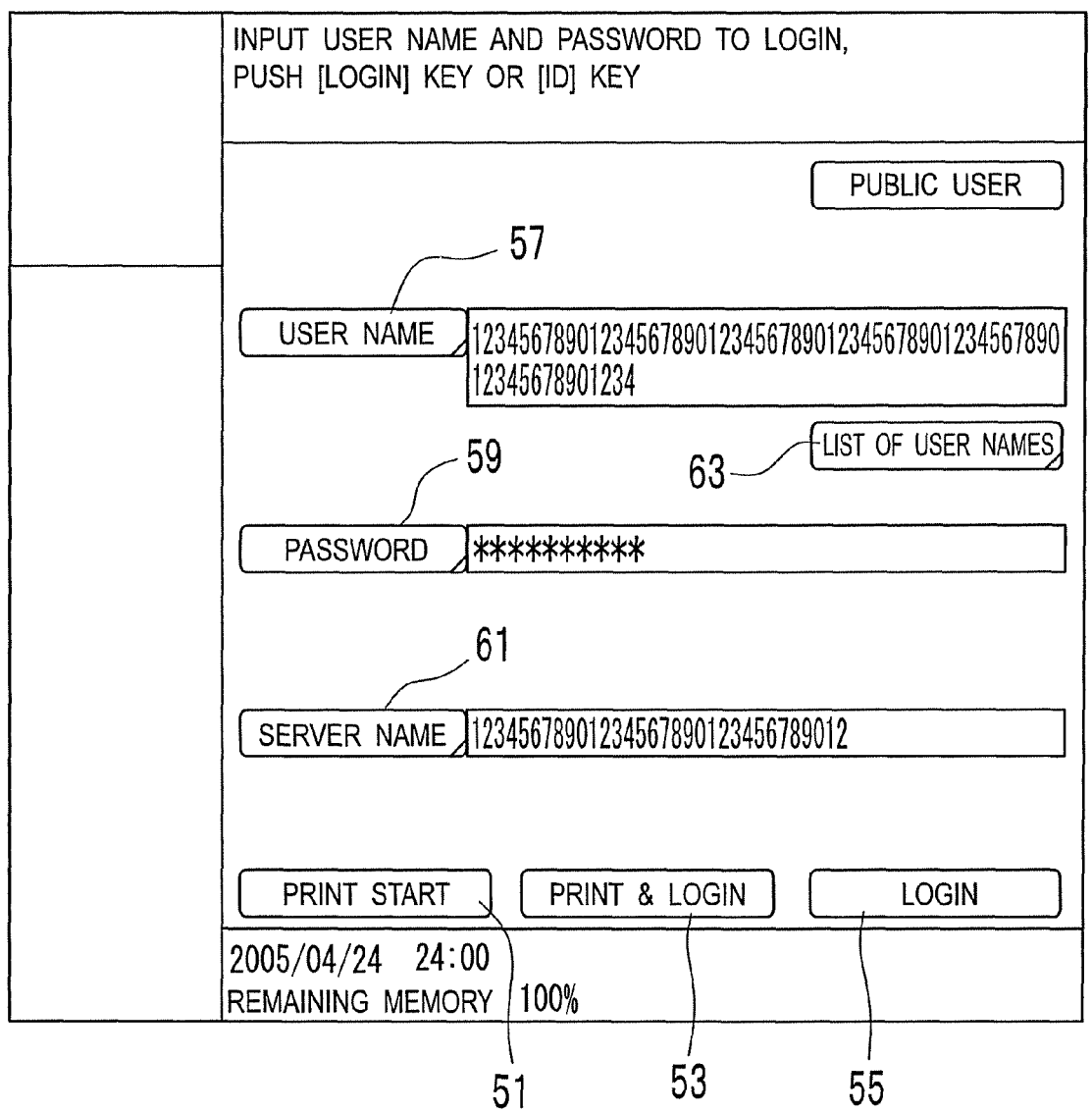
FIG. 5 is a user interface display example in time of user authentication using the user interface.

FIG. 5 is a diagram of a display example of the user interface 25 in step S107. This figure is a display example of the user interface 25 when the MFP 1 uses the user interface 25 as an authentication means for the authentication print and performs the user authentication.

The MFP 1 displays, on the user interface 25, a user name input button 57, a user name list display button 63, a password input button 59, and a server name input button 61. The MFP 1 also displays, on the user interface 25, a print start button 51, a print & login button 53, and a login button 55.

The print start button 51 is a button for the user to instruct only the authentication print printout process. When the button 51 is pushed, the MFP 1 starts the execution of the authentication print printout process with the information input/output mode of the user interface 25 at the non-login mode at the point the user authentication to be hereinafter performed is successful.

The print & login button 53 is a button for the user to instruct start of execution of the authentication print printout process and transfer to the login mode of the information input/output mode of the user interface 25. When the button 53 is pushed, the MFP 1 starts the execution of the authentication print printout process at the point the user authentication, to be hereinafter performed, is successful, and at substantially the same time, switches the information input/output mode of the user interface 25 from the non-login mode to the login mode. In the present embodiment, the user interface 25 displays a primary screen, as hereinafter described, when transferring to the login mode.

The login button 55 is a button for the user to instruct the transition to the login mode of the information input/output mode of the user interface 25. When the button 55 is pushed, the MFP 1 switches the information input/output mode of the user interface 25 from the non-login mode to the login mode at the point the user authentication to be hereinafter performed is successful.

The print start button 51, the print & login button 53, and the login button 55 configure the authentication user operation mode selecting button.

Figure 6:
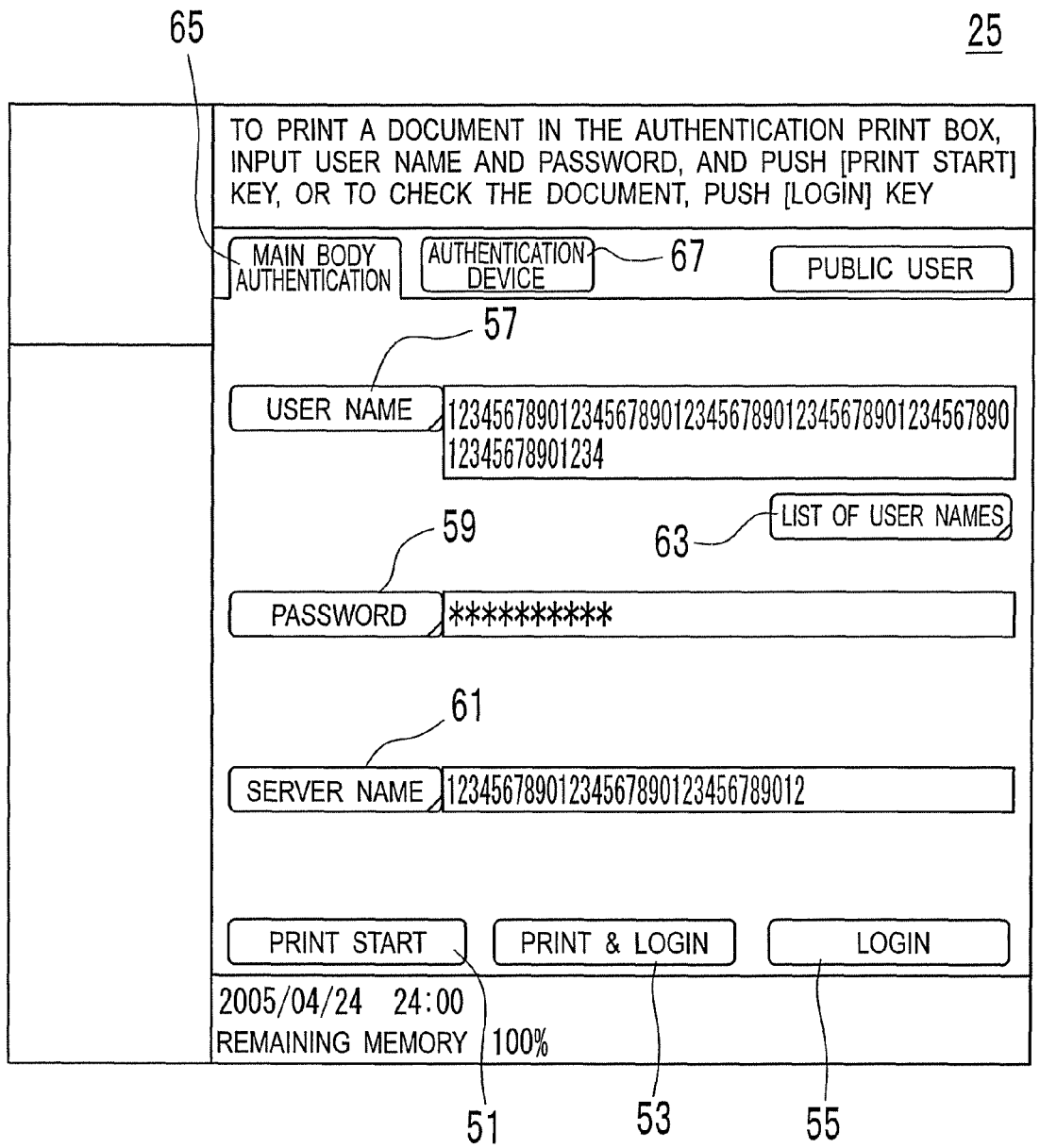
FIG. 6 is a user interface display example in time of user authentication when an authentication unit is arranged.

FIG. 6 is another example of a display example of the user interface 25 in step S107. This figure is a display example of the user interface 25 when the MFP 1 uses the user interface 25 and/or the authentication unit 27 as an authentication means for authentication print, and performs user authentication.

In this example, the MFP 1 displays an authentication device tab 67 on the user interface 25 in addition to the buttons similar to FIG. 5. The authentication device tab 67 has a function serving as a button for transferring to a convenient screen for the user to execute the user authentication using the authentication unit 27.

Figure 7:
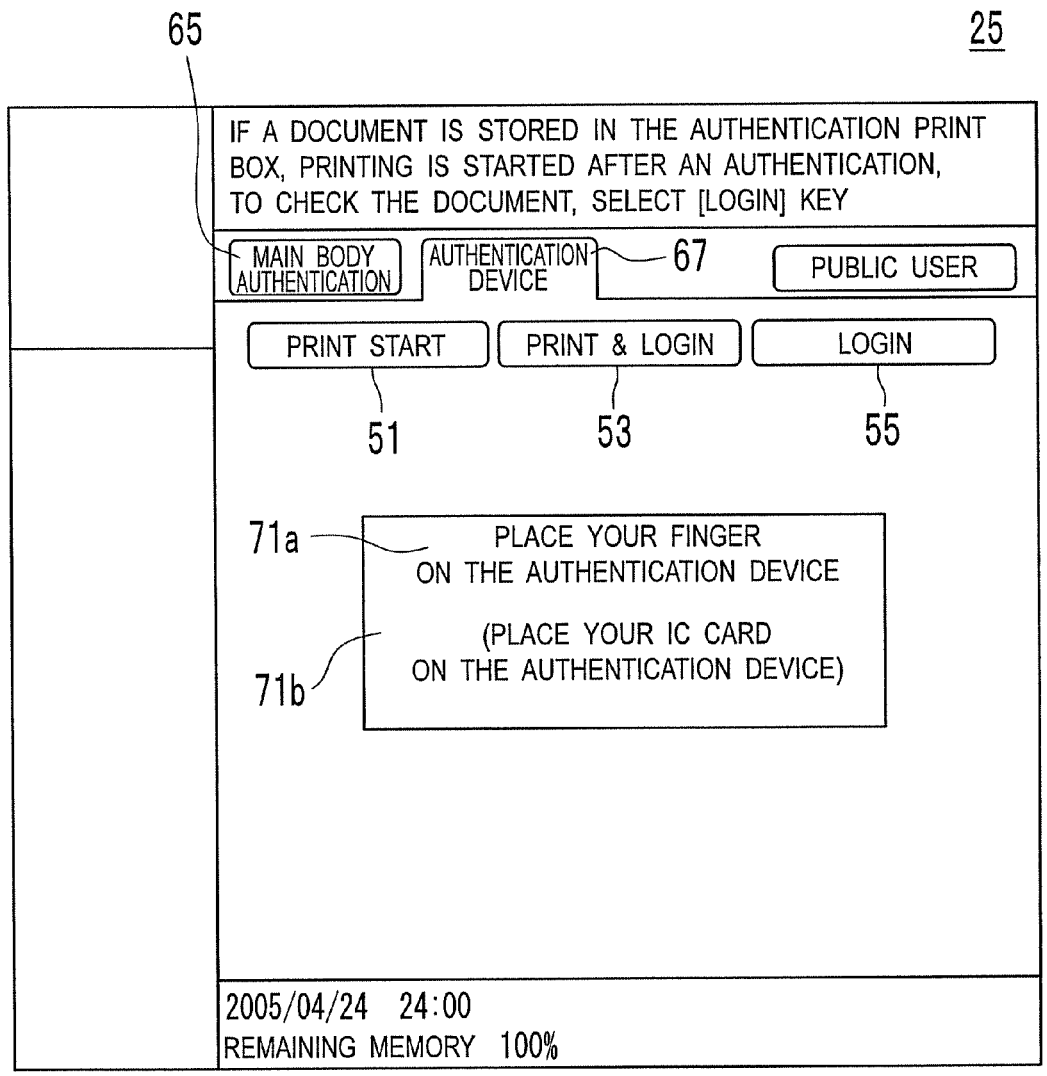
FIG. 7 is a user interface display example for user authentication using the authentication unit.

FIG. 7 is a diagram of an example of a screen that is displayed when the authentication device tab 67 is pushed. In the figure, a message 71*a* or 71*b* urging the user authentication using the authentication unit 27 to the user is displayed. The message 71*a* is a message of when a fingerprint authentication device, which is one type of biometric authentication device, is arranged in the MFP 1 as the authentication unit 27.

The message 71*b* is a message of when an IC card reader (smart card reader) is arranged in the MFP 1 as the authentication unit 27.

Figure 8:
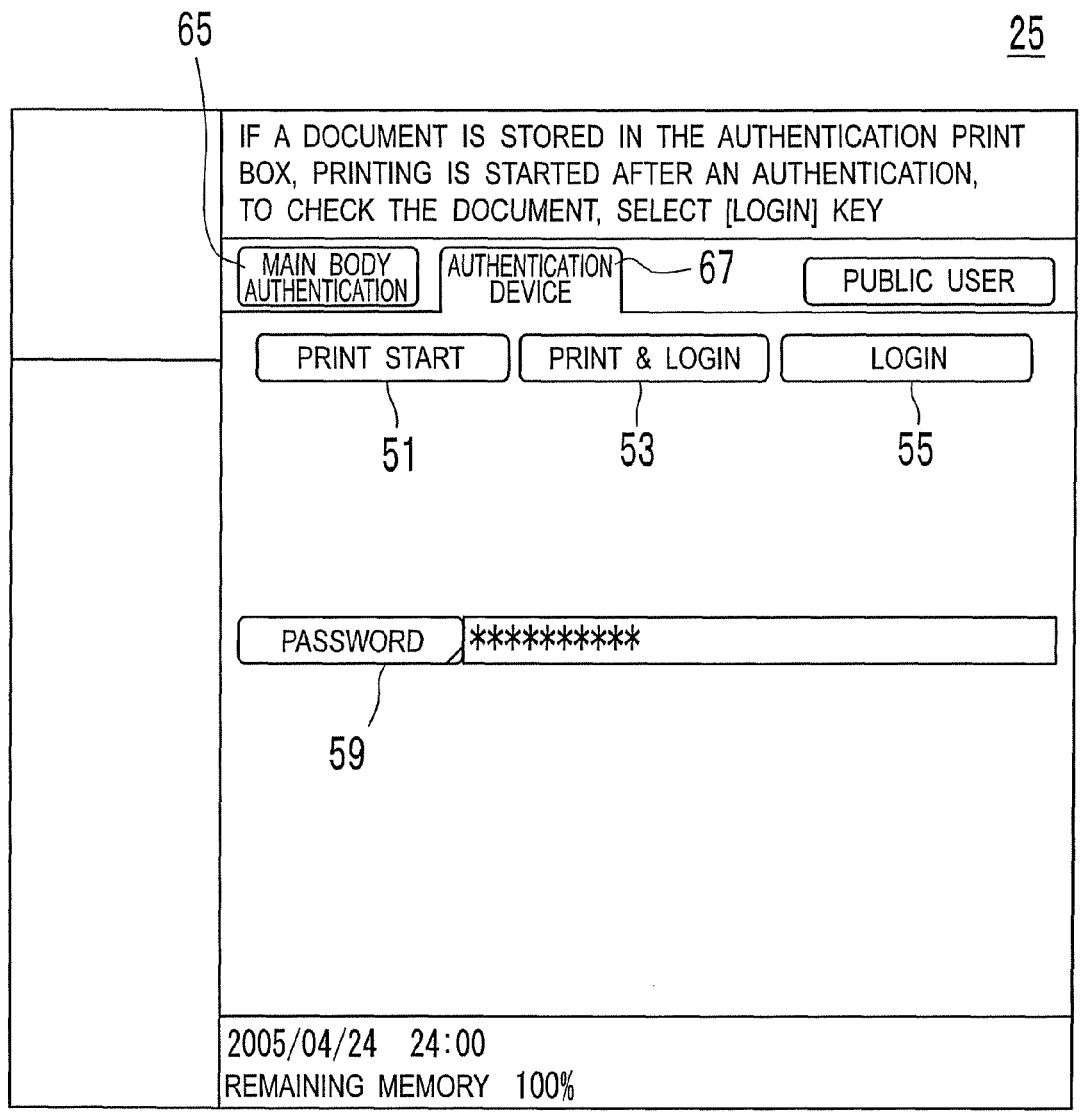
FIG. 8 is a user interface display example for user authentication using the authentication unit and the user interface.

FIG. 8 is a diagram of another example of a screen displayed when the authentication device tab 67 of FIG. 6 is pushed. This figure is a display example of when the MFP 1 executes the user authentication using the authentication unit 27 and the user interface 25. The user is required to input a password through the user interface 25 in addition to the input of authentication information through the authentication unit 27.

Figure 9:
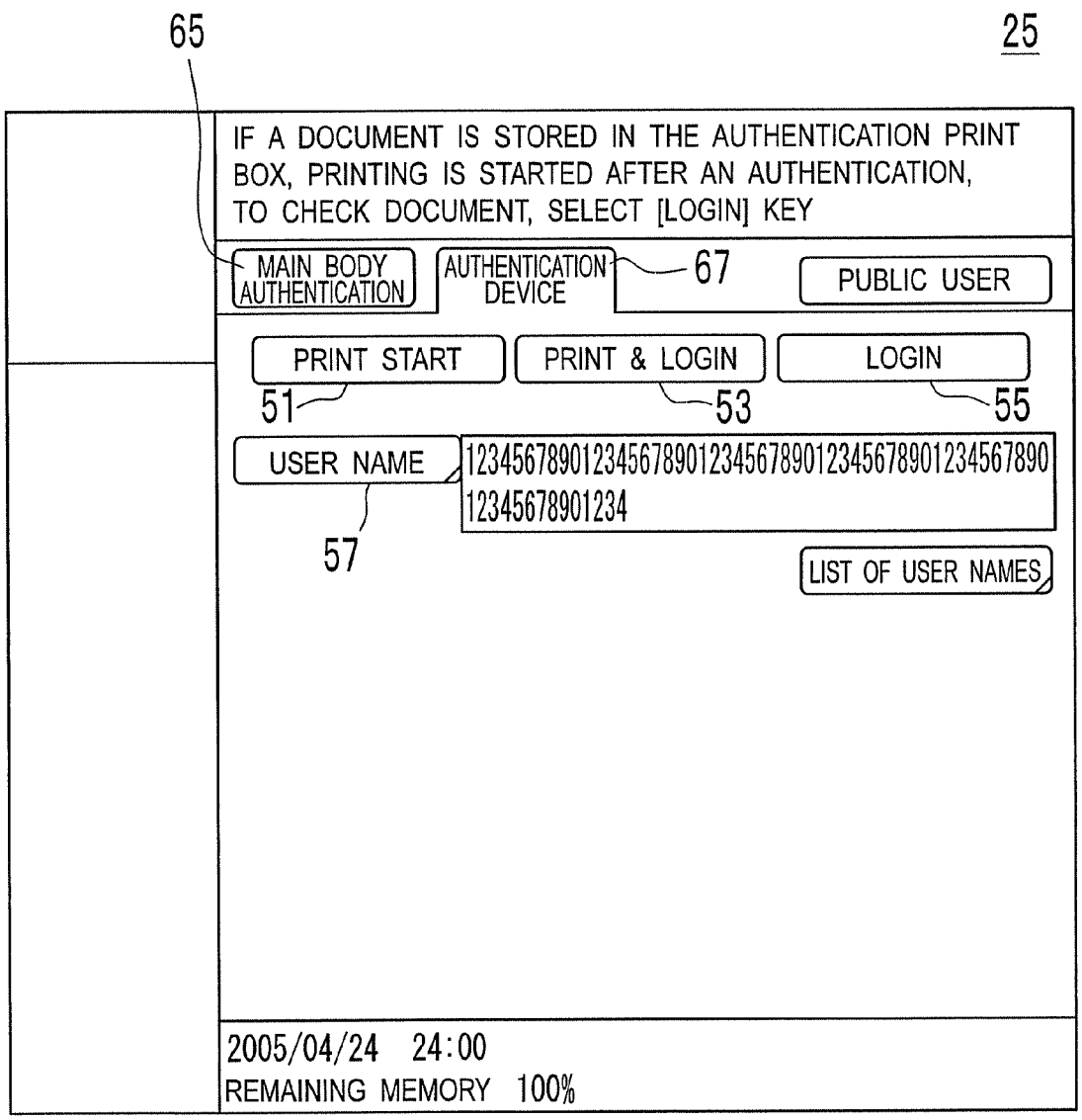
FIG. 9 is a user interface display example for user authentication using the authentication unit.

FIG. 9 is a diagram of another example of a screen displayed when the authentication device tab 67 of FIG. 6 is pushed. This figure is a display example of when the MFP 1 executes the user authentication using the authentication unit 27. The user is requested to input a user name via the user interface 25 in addition to the input of authentication information through the authentication unit 27. In this case, the MFP 1 performs a one to one matching of the user name input by the user and the authentication information input by the user from the authentication unit 27.

Returning to FIG. 4, the MFP 1 accepts the user authentication using the authentication unit 27, and the like in step S109.

In step S111, the user authentication unit 39 of the MFP 1 performs the user authentication and outputs the result of the determination ("success" or "fail") If the result of the user authentication is "success" ("YES" in step S111), the process proceeds to step S113. If the result of the user authentication is "fail" ("NO" in step S111), the process returns to step S109, and the MFP 1 continues to accept the user authentication.

In step S113, the MFP 1 refers to the operation mode selecting information input by the user in step S107, and determines whether the operation mode selecting button pushed by the user is the "login" button 55. The process proceeds to step S127 if the operation mode selecting button pushed by the user is the "login" button 55 ("YES" in step S113). The process proceeds to step S115 if the operation mode selecting button pushed by the user is not the "login" button 55 ("NO" in step S113).

In step S115, the MFP 1 refers to the operation mode selecting information input by the user in step S107, and determines whether the operation mode selecting button pushed by the user is the "print start" button 51. The process proceeds to step S123 if the operation mode selecting button pushed by the user is the "print start" button 51 ("YES" in step S115). The process proceeds to step S117 if the operation mode selecting button pushed by the user is not the "print start" button 51 ("NO" in step S115).

In step S117, the MFP 1 refers to the operation mode selecting information input by the user in step S107, and determines whether the operation mode selecting button pushed by the user is the "print & login" button 53. The process proceeds to step S119 if the operation mode selecting button pushed by the user is the "print & login" button 53 ("YES" in step S117). The process returns to step S107 if the operation mode selecting button pushed by the user is not the "print & login" button 53 ("NO" in step S117).

If the operation mode selecting button pushed by the user is the "print & login" button 53, that is, if the process proceeds to step S119, the MFP 1 (user interface input mode switching unit 43 etc.) performs a process of switching the information input/output mode of the operation panel (user interface 25) to the login mode in step S119. The user authentication for transition to the login mode is performed by invoking the result of user authentication for the authentication print printout process, and thus the authentication for transition is unnecessary.

In step S121, the MFP 1 displays the primary screen on the user interface 25.

Figure 10:
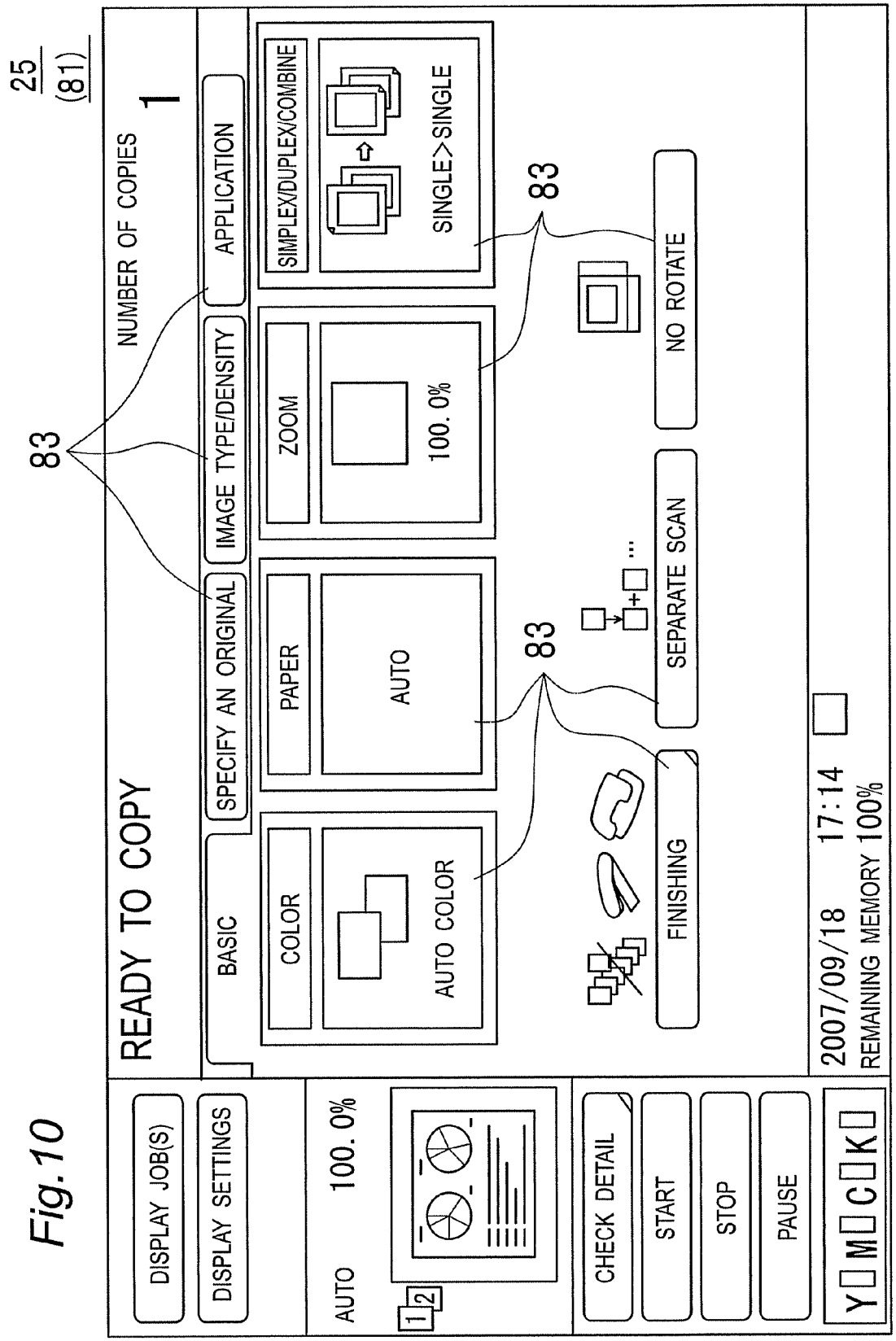
FIG. 10 is a display example of a primary screen in time of login (in copy mode selection)
Figure 11:
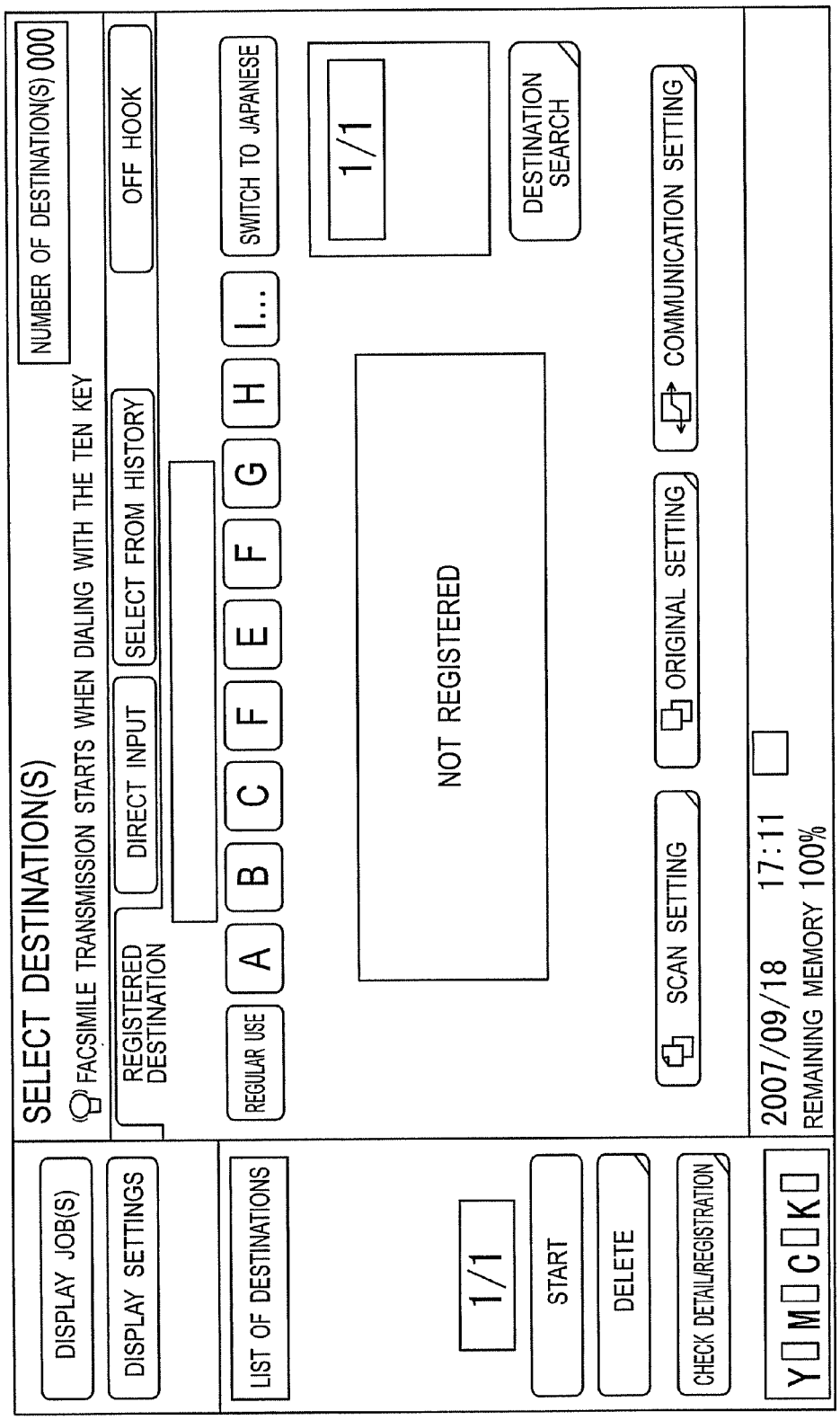
FIG. 11 is a display example of a primary screen in time of login (in facsimile transmission mode selection).

FIGS. 10 and 11 each are diagrams of display examples of the primary screen. FIG. 10 shows a primary screen of when the MFP 1 is used as a copying machine. The user uses the operation button group 83 of the primary screen and operates the stop button to stop the job in which the authentication print printout process is being performed, or operates the job display and the start button to input another copy job. The job in execution can be paused by operating a pause button, and furthermore, the execution of the relevant job can be resumed by operating the same pause button. FIG. 11 shows a primary screen of when the MFP 1 is used as a facsimile transmitter. The primary screen is displayed by operating a facsimile function selecting button (not shown) arranged on the body of the MFP 1 in time of login. The user can use the operation button group 83 of the primary screen to input another facsimile transmission job when the authentication print printout process is being carried out, or start the transmission thereof by operating the start button.

Returning to FIG. 4, in step S123, the MFP 1 determines whether or not the job data of the job input by the user related to the user authentication is held in the job data holding unit 33. The process proceeds to step S125 if the job data is held in the job data holding unit 33 ("YES" in step S123). The process terminates if the job data of the job input by the user related to the user authentication is not held in the job data holding unit 33 ("NO" in step S123).

In step S125, the job executing unit 41 of the MFP 1 executes the printout process related to the job data. In step S127, the MFP 1 performs the process of switching the information input/output mode of the operation panel (user interface 25) to the login mode, similar to step S119.

In step S129, the MFP 1 displays the primary screen on the user interface 25, similar to step S121.

In this manner, in the image forming device (MFP 1) according to the present embodiment, when desiring to start the execution of the authentication print printout process and to perform operation on the MFP 1 through the user interface 25, the user executes the user authentication for the operation performed by invoking the result of the user authentication for the authentication print printout process. Thus, the user can operate the MFP 1 through the user interface 25 at substantially the same time as the start of execution of the authentication print printout process if the user authentication for the authentication print printout process is successful.

The image forming device according to the present embodiment succeeds in solving the problems of ensuring information security, enhancing productivity, and improving operability of the image forming device at high level.

The image forming device according to the present invention is an image forming device capable of satisfying both excellent productivity and operability, and reliable ensuring of information security at high level.

What is claimed is:

1. An image forming device capable of executing an authentication print printing, which is a printout process requiring a first input of user authentication using a predetermined authentication device and determining start of execution of the printout based on a result of the user authentication, and requiring a second input of user authentication in a separate operation for transitioning a user interface of the image forming device from a non-login mode to a login mode; the image forming device comprising:

a communication interface, communicating with an external terminal, that receives job data from the terminal;
an authentication print detecting unit that detects whether to execute a job related to the job data as the authentication print printing or a normal printout process by referencing predetermined data;
an authentication unit that is the predetermined authentication device;
a user authentication unit that outputs the result of the user authentication using the authentication unit;
a job executing unit for executing the job related to the job data based on the result of the user authentication;
a user interface with a display which provides information and an input unit which receives an input of information; and
a user interface input mode switching unit for switching an information input/output mode of the user interface,
wherein the input unit inputs an instruction to execute a first process and
wherein the first process includes processes in which:
the user authentication unit performs a user authentication for executing the authentication print printing using the first input of user authentication;
the job executing unit starts the execution of the authentication print printing related to the job data based on the result of the user authentication output by the user authentication unit; and
the user interface input mode switching unit invokes the result of the first input of user authentication used in the authentication print printing output from the user authentication unit for the second input user authentication to switch the information input/output mode of the user interface from a non-login mode to a login mode of information input/output mode capable of inputting information other than information related to the user authentication to start the execution of the authentication print printing.

2. The image forming device according to claim 1, wherein the first process includes a process in which
the user interface input mode switching unit displays a primary screen for receiving an input of at least one instruction of temporarily stopping or stopping the job related to the job data or a job different from the job related to the job data on the user interface.

3. The image forming device according to claim 1, wherein the input unit receives an input of an instruction to execute a second process; and
the second process includes processes in which the user authentication unit performs user authentication to execute the authentication print printing, and the job executing unit starts the execution of the authentication print printing related to the job data based on the result of the user authentication output by the user authentication unit.

4. The image forming device according to claim 1, wherein the input unit receives an input of an instruction to execute a third process; and
the third process includes a processes in which the user authentication unit performs user authentication to execute the authentication print printing, and the user interface input mode invokes the result of the user authentication output form the user authentication unit so as to switch the information input/output mode of the user interface to the login mode.

5. A non-transitory computer readable medium storing an image forming program executable by a computer of an image forming device capable of executing an authentication print printing, which is a printout process requiring a first input of user authentication using a predetermined authentication device and determining start of execution of the printout based on a result of the user authentication, and requiring a second input of user authentication in a separate operation for transitioning a user interface of the image forming device from a non-login mode to a login mode; the program comprising:

- code that receives job data from a terminal, communicating with the external terminal;
- code that detects whether to execute a job related to the job data as the authentication print printing or a normal printout process by referencing predetermined data;
- code that outputs the result of the user authentication using the predetermined authentication device;
- code that executes the job related to the job data based on the result of the user authentication;
- code that enables a user interface with a display which provides information and an input unit which receives an input of information to receive an input of instruction to execute a first process; and
- code that switches an information input/output mode of the user interface, wherein the first process includes processes in which:
- a user authentication for executing the authentication print printing is performed using the first input of user authentication;
- the execution of the authentication print printing related to the job data starts based on the result of the user authentication; and
- the result of the first input of user authentication used in the authentication print printing is invoked for the second input user authentication so that the information input/output mode of the user interface is switched from a non-login mode to a login mode of the information input/output mode capable of inputting information other than information related to the user authentication to start the execution of the authentication print printing.

6. The non-transitory computer readable medium according to claim 5, wherein the first process includes a process in which
the code that switches the information input/output mode of the user interface displays a primary screen for receiving an input of at least one instruction of temporarily stopping or stopping the job related to the job data or a job different from the job related to the job data on the user interface.

7. The non-transitory computer readable medium according to claim 5, wherein the code that enables the input unit enables the input unit to receive an input of an instruction to execute a second process; and
the second process includes processes in which the user authentication is performed to execute the authentication print printing, and the code that executes the job starts the execution of the authentication print printing related to the job data based on the result of the output user authentication.

8. The non-transitory computer readable medium according to claim 5, wherein the code that enables the input unit enables the input unit to receive an input of an instruction to execute a third process; and
the third process includes a processes in which the user authentication is performed to execute the authentication print printing, and the user interface input mode invokes the result of the user authentication output so as to switch the information input/output mode of the user interface to the login mode.

* * * * *